United States Patent

Pak-Harvey et al.

[11] Patent Number: 5,519,084
[45] Date of Patent: May 21, 1996

[54] REDISPERSIBLE ACRYLIC POLYMER POWDER FOR CEMENTITIOUS COMPOSITIONS

[75] Inventors: Helen Pak-Harvey, North Wales; Chung-Ling Mao, Emmaus, both of Pa.

[73] Assignee: Air Products and Chemicals, Inc., Allentown, Pa.

[21] Appl. No.: 173,251

[22] Filed: Dec. 23, 1993

Related U.S. Application Data

[63] Continuation of Ser. No. 986,956, Dec. 8, 1992, abandoned.

[51] Int. Cl.$^6$ ................................................. C08L 29/04
[52] U.S. Cl. ................................ 524/503; 524/803; 525/57; 526/202
[58] Field of Search .................................. 524/803, 503; 526/202; 525/57

[56] References Cited

U.S. PATENT DOCUMENTS

| | | | |
|---|---|---|---|
| 3,196,122 | 7/1965 | Evans | 260/29.6 |
| 3,409,578 | 11/1968 | Hwa | 260/29.6 |
| 3,547,853 | 12/1970 | Kalandiah | 260/29.6 |
| 3,950,294 | 4/1976 | Connelly | 524/577 |
| 3,996,181 | 12/1976 | Hayashi et al. | 524/503 |
| 4,405,747 | 9/1983 | Ehmann et al. | 524/503 |
| 4,528,315 | 7/1985 | Eck et al. | 524/458 |
| 4,879,336 | 11/1989 | Schilling et al. | 524/503 |
| 5,118,751 | 6/1992 | Schulze et al. | 524/503 |

FOREIGN PATENT DOCUMENTS

| | | |
|---|---|---|
| 4185606-A | of 0000 | Japan . |
| 4185607-A | of 0000 | Japan . |
| 314117 | of 1990 | Japan . |
| 314116 | of 1990 | Japan . |

*Primary Examiner*—Edward J. Cain
*Attorney, Agent, or Firm*—Michael Leach; William F. Marsh

[57] ABSTRACT

A method for preparing an acrylic polymer powder which is redispersible in water by atomizing an aqueous polymer dispersion containing a dispersing aid, the improvement which comprises employing an acrylic polymer containing 1–15 wt % olefinically unsaturated carboxylic acid comonomer and an effective amount of a dispersing aid consisting essentially of polyvinyl alcohol.

12 Claims, No Drawings

REDISPERSIBLE ACRYLIC POLYMER POWDER FOR CEMENTITIOUS COMPOSITIONS

This is a continuation of application Ser. No. 07/986,956, filed on Dec. 8, 1992, now abandoned.

TECHNICAL FIELD

The present invention relates to polymer emulsions that have been spray dried into redispersible powders which are useful as additives in cementitious compositions.

BACKGROUND OF THE INVENTION

Polymer modified hydraulic cement compositions are widely used in industry. There has been extensive investigations of polymer modified hydraulic cement which shows that such polymer modifications of cementitious compositions improve strength, adhesion, flexibility and workability. Much of the modifier admixtures have been in the form of aqueous dispersions. The disadvantage to using a liquid latex is that it requires the end user to mix the liquid polymer composition with the cement at the job site, thereby requiring a two-component mixture. In addition, the two components have to be packaged separately, a wet container for the latex and a dry container or bag for the cement.

The concept of using a redispersible, dry polymer for cement modification is such that the powdered polymer is dry mixed with the cement and aggregate premixture at the job site; all that is required is the addition of water. During the wet mixing with water, the powder polymer becomes re-emulsified, or redispersed, in the modified cement mixture and performs similarly to the liquid latex.

Redispersible polymer powders are polymer emulsions which have been converted by spray drying (atomizing the aqueous polymer dispersions in a stream of hot air) to free flowing powders. When blended with water, these powders redisperse back into liquid emulsions with essentially identical properties to the original emulsions.

With dispersions whose polymers have glass transition temperatures (Tg) below about 50° C., it is necessary to add dispersing aids to coat the individual spray dried particles to prevent them from sticking together and to promote redispersion of the particles into an emulsion. Sticking can occur in the spray drying apparatus when the powder is at elevated temperatures, or upon long term storage under the influences of heat, humidity and pressure.

U.S. Pat. No. 3,409,578 discloses the preparation of a dry cementitious composition modified by an acrylic polymer powder. The acrylic polymer powder is prepared from a latex and contains carboxylate groups in the dispersed polymer, or the dispersing agent for the polymer, or in both. The carboxylate groups may be in the acid form or in the form of a monovalent metal salt or an ammonium salt.

U.S. Pat. No. 3,196,122 discloses cementitious compositions prepared using acrylic polymer emulsions.

U.S. Pat. No. 3,547,853 discloses cementitious compositions comprising a dry redispersible acrylic polymer, an aliphatic hydroxycarboxylic acid set-retarding agent that also serves as a sequestrant, and trimethylol propane, trimethylol ethane or mixture of the latter two compounds. The acrylic polymer may be any water-insoluble emulsion polymer of one or more (meth)acrylic esters or such a polymer containing about 1 to 10 wt % olefinically unsaturated acid.

SUMMARY OF THE INVENTION

The present invention provides an acrylic polymer powder which is readily redispersible in water and is obtained by spray drying, or atomizing, an aqueous acrylic polymer dispersion containing a polyvinyl alcohol (PVOH) dispersing aid. The acrylic polymer comprises 1–15 wt %, based on total monomer, of an olefinically unsaturated carboxylic acid comonomer.

The redispersible polymer powders obtained according to the process are particularly suited as additives to cementitious compositions, such as gypsum, cement, mortar and magnesium cement.

One of the challenges in making an acceptable, redispersible acrylic powder is to incorporate a water-sensitive monomer into the polymer so that it has hydrophilicity and/or alkaline sensitivity. However, the presence of water soluble monomers capable of hydrogen bonding in the cement matrix inhibits the hydration of the cement and the set time may be significantly retarded. It is important to incorporate the minimum level of water-soluble monomer into the emulsion polymer to insure that the set time is not affected. The present invention does not retard the set time of cement.

DETAILED DESCRIPTION OF THE INVENTION

The polymer dispersions for the preparation of the redispersible polymer powders can be obtained in a conventional manner by aqueous emulsion polymerization of acrylic monomers in the presence of conventional thermal and/or redox polymerization initiators and stabilizing agents such as surfactants and/or protective colloids at elevated temperatures, for example, up to about 90° C. The mean particle size can be adjusted by conventional measures, for example, via the type and amount of the surfactants. Thus the surfactants composing the stabilizing system which may be used in the polymerization recipe for making the acrylic polymer dispersions include ionic and/or nonionic surfactants which are well known to those skilled in the polymerization art. Protective colloids, such as, for example, PVOH, polyvinyl pyrrolidone and cellulosics, frequently have an advantageous effect and are often used in combination with the surfactants.

The concentration range of the total amount of surfactants useful is from 0.5 to 10 wt %, preferably 1 to 6 wt %, based on total emulsion.

In the preparation of the polymer dispersions that may be spray dried to yield the polymer powders, the polymer content of the dispersion may vary from 40 to 65 wt % and particularly from 45 to 55 wt %. The polymers generally have glass transition temperatures (Tg) of from +50 to −60° C., polymers having a Tg of less than +25° C. preferably being used.

The acrylic polymers generally contain about 85 to 99 wt % esters of acrylic acid or methacrylic acid and about 1 to 15 wt %, based on total monomer weight, of an olefinically unsaturated acid comonomer to render the latex redispersible in the aqueous medium upon alkaline treatment. Suitable ester monomers include esters of acrylic acid or methacrylic acid with $C_1$–$C_{18}$ alcohols, especially $C_1$–$C_8$ alcohols.

The polymer must contain acid functional comonomers at about 1–15 wt %, preferably 3–10 wt % to give the polymer water sensitivity. Any olefinically unsaturated carboxylic acid may be used, including mono-, di- and polycarboxy, mono- and polyolefinic acids. Illustrative of such acid comonomers are acrylic acid, itaconic acid, citraconic acid, methacrylic acid, crotonic acid, cinnamic acid, and the like. It is preferred to use these comonomer acids at 5 to 10 wt %.

In addition, the acrylic polymers may contain up to 20 wt % of other comonomers, including, for example, vinyl aromatic monomers, such as styrene; vinyl esters, in particular of acetic and propionic acids, as well as vinyl laurate and vinyl esters of versatic acids; vinyl chloride and/or vinylidine chloride; ethylene and diolefins, in particular butadiene; acrylonitrile and amides, such as acrylamide, methacrylamide, N-methylol-(meth)acrylamide. The amount of such comonomers can be varied within a wide range.

The polymer may contain hydrophilic or polar groups in concentrations below that which would render the polymer soluble in water.

Prior to spray drying, the aqueous polymer emulsion is neutralized with a base to at least pH 7. The carboxylate groups of the polymer are neutralized with a mono- or polyvalent metal ion. Examples of suitable ions include calcium, magnesium, sodium, potassium, lithium, strontium, barium, aluminum, lead, zirconium, cerium, cobalt, chromium, zinc, iron, manganese, nickel and tin. The ion can be added in the form of a basic, neutral or acidic salt, as a hydroxide, oxide or carbonate. The ion source should have sufficient solubility in aqueous conditions so crosslinking and/or neutralization of the carboxylate groups with the metal ion can take place. This neutralized latex gives the polymer water-sensitivity that, when the dispersing aid is added, will prevent coalescence of the particles upon drying. The salts may be added stoichiometrically or in excess amounts if needed for redispersibility. Calcium hydroxide or sodium hydroxide, for example, is typically added to the dispersion to adjust the pH to at least 7.

In the preparation of the acrylic polymer powders according to the invention, PVOH is added to the dispersion in the form of an aqueous solution. Suitable PVOHs include those having a degree of hydrolysis ranging from 87 to 99 mole % and a degree of polymerization (DPn) ranging from 200 to 5000. An amount of PVOH effective for redispersing the dried acrylic polymer powder in water, such as from 2–25 wt %, preferably 5–15 wt %, based on the polymer content of the aqueous polymer dispersions, is utilized.

In addition to the PVOH, other dispersing aids may be used, including reelamine formaldehydes, lignosulfonate salts, polyvinyl pyrrolidone, poly(vinylformamide), hydroxyethylcellulose, poly(meth)acrylates and the like.

Spray drying, or atomization, of the aqueous polymer dispersions which contain PVOH can be carried out in a conventional manner well known in the art, in particular using one-material or multi-material nozzles or atomizer disks. The dispersions are generally atomized in a warm air stream in which the water evaporates. Atomization can be carried out under atmospheric or reduced pressure. In general, the temperature of the warm air stream used for spray drying is from 100– 200° C., in particular from 100–170° C. The dry, redispersible acrylic polymer powders can be separated off in a conventional manner, in particular using cyclones or filtered evaporators.

Polymer powders having good blocking resistance are obtained in a high yield and can be readily stored at room temperature, without caking. The polymer powders are readily redispersible in water.

As modifiers for cementitious mixtures, the polymer powders at 5–30 wt % are mixed with cement.

It may be advantageous in some systems to add an inert filler material such as clay, chalk, talc, silica or other fine sized particles, to reduce the tendency for the redispersible powder to block over long-term storage. The useful range of this filler is from 0– 40 wt %, based on the redispersible polymer powder, preferably from 8–30 wt %. The amount of filler material used depends on the particular polymer and its Tg.

The invention provides a dry powder polymer which may be redispersed to form a latex for cementitious applications. The dry powder redisperses back into the same dispersion form with respect to particle size distribution. Since the dry powder can be blended with sand, cement and other dry ingredients and transported directly to the site of usage, the shipping costs associated for the aqueous medium is eliminated. For cementitious applications where dry materials like cement are used, a one-step mixing process carried out by the end user can be advantageous.

EXAMPLE 1

To 86 parts by weight (pbw) solids of an aqueous butyl acrylate/methyl methacrylate/methacrylic acid (45.5/45.5/7.5 wt ratio) terpolymer latex containing 0.5% sodium lauryl ether sulfate there was added 5 pbw calcium hydroxide in aqueous solution. After neutralization and mixing, 9 pbw of a 20% aqueous solution of polyvinyl alcohol (87–89 mole % hydrolyzed; Mw 31,000–50,000) was added. The polymer mixture was mixed at room temperature and spray dried using conventional techniques at 100° C. to form a fine, free-flowing powder of 0.31 g/ml bulk density. These powders were readily dispersible in water. The redispersed latex was stable and performed in cementitious applications as would an acrylic latex.

EXAMPLE 2

A latex premix formulation was prepared using three components.

(1) 85 pbw solids of an aqueous butyl acrylate/methyl methacrylate/acrylic acid/methacrylic acid (41/54/2.5/2.5) copolymer latex at 50% solids containing 1% sodium lauryl ether sulfate;

(2) 5 pbw of sodium hydroxide added in 50% aqueous solution; and (3) 10 pbw of PVOH (87–89 mole % hydrolyzed; Mw 31,000– 50,000).

This premix was spray dried at 100° C. with introduction of kaolin clay at 5% based on the powder weight to yield a fine, free-flowing polymer powder. The powder redispersed instantaneously at 25° C. in water.

EXAMPLE 3

The polymer powder of Example 1 was used in the ASTM C109 cement patching application and compared to Rohm & Haas MC76 acrylic latex, a commercial aqueous acrylic latex. The polymers were evaluated at use level of 15% based on weight of cement with the water level adjusted to obtain equivalent flow.

|  | Polymer powder | Acrylic latex |
| --- | --- | --- |
| Type I cement (g) | 900 | 900 |
| C109 sand (g) | 2475 | 2475 |
| superplasticizer | 8 | — |
| powder (g) | 127 | — |

-continued

|  | Polymer powder | Acrylic latex |
|---|---|---|
| latex (g) | — | 281 (48%) |
| water (g) | 375 | 190 |
| defoamer (g) | 2.5 | 4.0 |
| compress. strength (psi; MPa) | | |
| 1 day | 1633; 10.9 | 1632; 10.9 |
| 7 day | 3619; 24.2 | 2928; 19.6 |
| tensile strength (psi; MPa) | | |
| 7 day dry | 661; 4.4 | 630; 4.2 |
| 7 + 1 day wet | 347; 2.3 | 365; 2.4 |

STATEMENT OF INDUSTRIAL APPLICATION

The present invention provides a method for preparing spray dried acrylic polymer powders that are useful as additives in cementitious compositions.

We claim:

1. An acrylic polymer powder which is redispersible in water consisting essentially of a spray dried aqueous dispersion of an acrylic polymer consisting essentially of 85 to 99 wt % acrylate and methacrylate esters, 1–15 wt % olefinically unsaturated carboxylic acid comonomer and, optionally, up to 20 wt % other comonomers, the aqueous acrylic polymer dispersion prepared by emulsion polymerization of the monomers in the presence of a surfactant and then neutralized with a base to at least pH 7, and containing a post-added dispersing aid consisting essentially of polyvinyl alcohol.

2. The acrylic polymer powder of claim 1 in which the polyvinyl alcohol is 87–99 mole % hydrolyzed.

3. The acrylic polymer powder of claim 1 in which the polyvinyl alcohol has a degree of polymerization of 200–5000.

4. The acrylic polymer powder of claim 1 in which the dispersion contained 2–25 wt % polyvinyl alcohol, based on polymer content of the dispersion.

5. The acrylic polymer powder of claim 1 in which the dispersion contained 5–15 wt % polyvinyl alcohol, based on polymer content of the dispersion.

6. The acrylic polymer powder of claim 1 which also contains melamine formaldehyde, lignosulfonate salt, polyvinyl pyrrolidone, poly(vinylformamide), hydroxyethylcellulose or poly(meth)acrylate as another dispersing aid.

7. An acrylic polymer powder which is redispersible in water consisting essentially of a spray dried aqueous dispersion of an acrylic polymer consisting essentially of 85 to 99 wt % acrylate and methacrylate esters, 1–15 wt % olefinically unsaturated carboxylic acid comonomer and, optionally, up to 20 wt % other comonomers, the aqueous acrylic polymer dispersion prepared by emulsion polymerization of the monomers in the presence of a surfactant and then neutralized with a base to at least pH 7, and containing 2–25 wt %, based on acrylic polymer content of the dispersion, of a post-added dispersing aid consisting essentially of polyvinyl alcohol which is 87–99 mole % hydrolyzed and has a DPn of 200–5000.

8. The acrylic polymer powder of claim 7 in which the acid comonomer is acrylic acid, methacrylic acid, itaconic acid and/or crotonic acid.

9. The acrylic polymer powder of claim 8 in which the polymer contains 3–10 wt % acid comonomer.

10. The acrylic polymer powder of claim 9 which comprises 5–15 wt % polyvinyl alcohol.

11. The acrylic polymer powder of claim 9 which also contains melamine formaldehyde, lignosulfonate salt, polyvinyl pyrrolidone, poly(vinylformamide), hydroxyethylcellulose or poly(meth)acrylate as another dispersing aid.

12. An acrylic polymer powder which is redispersible in water consisting essentially of a spray dried aqueous dispersion of an acrylic polymer consisting essentially of 85 to 99 wt % acrylate and methacrylate esters, 1–15 wt % olefinically unsaturated carboxylic acid comonomer which is at least one of acrylic acid, itaconic acid, citraconic acid, methacrylic acid, crotonic acid or cinnamic acid, and, optionally, up to 20 wt % other comonomers, the aqueous acrylic polymer dispersion prepared by emulsion polymerization of the monomers in the presence of a surfactant and then neutralized with a base to at least pH 7 and containing 2–25 wt % based on acrylic polymer content of the dispersion, of a post-added dispersing aid consisting essentially of polyvinyl alcohol which is 87–89 mole % hydrolyzed and has a DPn of 200–5000.

* * * * *